(12) United States Patent
Svensson et al.

(10) Patent No.: US 9,797,351 B2
(45) Date of Patent: Oct. 24, 2017

(54) DUCTED COMBUSTION SYSTEMS UTILIZING DUCT COOLING

(71) Applicant: Caterpillar Inc., Peoria, IL (US)

(72) Inventors: Kenth Svensson, Peoria, IL (US); Chad Koci, Washington, IL (US); Christopher Gehrke, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 108 days.

(21) Appl. No.: 14/792,253

(22) Filed: Jul. 6, 2015

(65) Prior Publication Data
US 2017/0009712 A1  Jan. 12, 2017

(51) Int. Cl.
F02M 61/18  (2006.01)
F02M 31/20  (2006.01)
F02F 1/24  (2006.01)

(52) U.S. Cl.
CPC ............. *F02M 31/20* (2013.01); *F02F 1/24* (2013.01); *F02M 61/1806* (2013.01); *F02M 61/1813* (2013.01)

(58) Field of Classification Search
CPC .................................. F02M 31/20; F02F 1/24
USPC .................. 123/298, 296, 305, 445
See application file for complete search history.

(56) References Cited

U.S. PATENT DOCUMENTS

| | | | |
|---|---|---|---|
| 5,860,394 A | 1/1999 | Saito et al. | |
| 7,021,558 B2 | 4/2006 | Chenanda et al. | |
| 7,963,461 B2 | 6/2011 | Kothen et al. | |
| 8,056,537 B2 | 11/2011 | Venkataraghavan et al. | |
| 8,371,254 B2 | 2/2013 | Beyer et al. | |
| 8,701,416 B2 * | 4/2014 | Teets ...................... | F23D 14/66 431/10 |
| 2012/0037124 A1 | 2/2012 | Peters et al. | |
| 2013/0112772 A1 | 5/2013 | Kishore | |
| 2014/0366542 A1 * | 12/2014 | Teets ...................... | F23R 3/286 60/738 |
| 2016/0097360 A1 * | 4/2016 | Mueller ................. | F02M 61/14 123/294 |
| 2016/0298531 A1 * | 10/2016 | Anders .................... | F02B 23/00 |
| 2016/0298583 A1 * | 10/2016 | Anders .................... | F02M 55/00 |

FOREIGN PATENT DOCUMENTS

| | | |
|---|---|---|
| AU | 2010200904 B2 | 12/2011 |
| CN | 203614254 U | 5/2014 |
| JP | 10169504 A | 6/1998 |
| RE | 40500 E | 9/2008 |
| RU | 135003 U1 | 11/2013 |

* cited by examiner

*Primary Examiner* — Hai Huynh
*Assistant Examiner* — Gonzalo Laguarda
(74) *Attorney, Agent, or Firm* — Miller, Matthias & Hull

(57) ABSTRACT

A ducted combustion system is disclosed. The ducted combustion system may include a combustion chamber and a fuel injector in fluid connection with the combustion chamber and including at least one orifice opening from an injector tip of the fuel injector, the at least one orifice injecting fuel into the combustion chamber as at least one fuel jet. The system may further include at least one duct disposed within the combustion chamber such that the at least one fuel jet, at least partially, enters the at least one duct upon being injected into the combustion chamber. The system may further include a duct cooling system configured to cool a mixture of fuel and air of the at least one fuel jet.

8 Claims, 18 Drawing Sheets

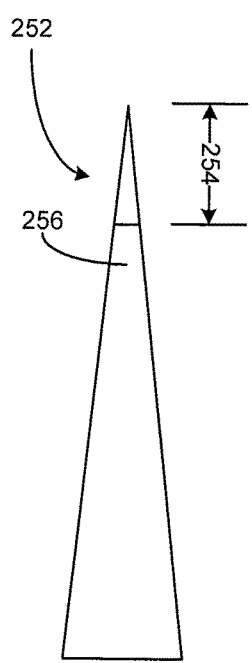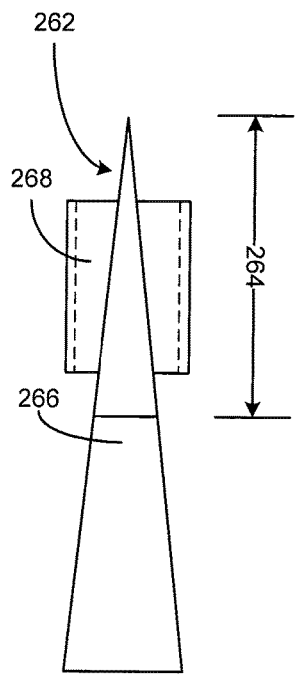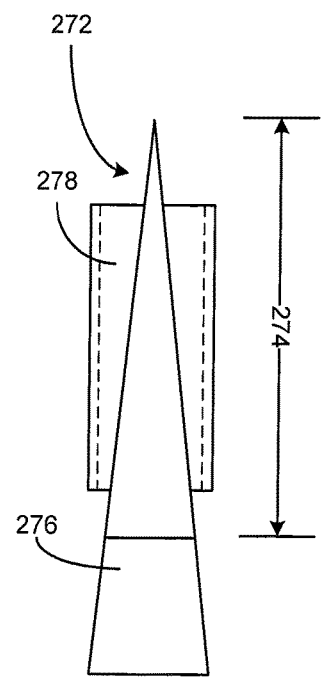
FIG. 18
*(Prior Art)*
FIG. 19
FIG. 20

DUCTED COMBUSTION SYSTEMS UTILIZING DUCT COOLING

TECHNICAL FIELD

The present disclosure generally relates to internal combustion engines and, more particularly, relates to ducted combustion systems for internal combustion engines that utilize duct cooling systems.

BACKGROUND

Modern combustion engines may include one or more cylinders as part of the engine. The cylinder and an associated piston may define a combustion chamber therebetween. Within the combustion chamber, fuel for combustion is directly injected into the combustion chamber by, for example, a fuel injector, which is associated with the cylinder and has an orifice disposed such that it can directly inject fuel into the combustion chamber.

Different mixtures and/or equivalence ratios of the fuel/air mixture within the fuel jet may produce different results during combustion. The manners in which the injected fuel mixes and/or interacts with the air and other environmental elements of the combustion chamber may impact combustion processes and associated emissions. Further, if the fuel and air mixing is inadequate, then suboptimal or abnormally large amounts of soot may form within the combustion chamber.

To aid in preventing or reducing soot formation and to increase efficiency in such combustion engines, systems and methods for ducted combustion have been developed. For example, U.S. Patent Publication No. 2012/0186555 ("Ducted Combustion Chamber for Direct Injection Engines and Method") discloses ducted combustion within a combustion engine. The ducts of the '555 application generally include fins disposed around a fuel jet injected by a fuel injector. Such ducts may form a passageway corresponding to an orifice of the fuel injector, into which fuel jets are injected. The fuel jets may be channeled into the ducts, which may improve fuel combustion because upstream regions of a direct-injected fuel jet may be affected by faster and more uniform mixing as well as by an inhibition or reduction of entrainment of combustion products from downstream regions of the same or neighboring jets.

While the teachings of the '555 application are advantageous in providing an improved fuel/air mixture, further improvements in both fuel/air mixtures and flame lift-off length in the ducts are always desired, as such improvements may further reduce emissions and soot formation. Therefore, systems and methods for ducted combustion that utilize duct cooling systems are desired.

SUMMARY

In accordance with one aspect of the disclosure, a ducted combustion system is disclosed. The ducted combustion system may include a combustion chamber, which is defined as an enclosure bound at a first end by a flame deck surface of a cylinder head of an internal combustion engine and bound at a second end by a piston top surface of a piston disposed within the internal combustion engine. The system may further include a fuel injector in fluid connection with the combustion chamber and including at least one orifice opening from an injector tip of the fuel injector, the at least one orifice injecting fuel into the combustion chamber as at least one fuel jet. The system may further include at least one duct disposed within the combustion chamber between the flame deck surface and the piston top surface, the at least one duct being disposed such that the at least one fuel jet, at least partially, enters the at least one duct upon being injected into the combustion chamber. The system may further include a duct cooling system configured to cool a mixture of fuel and air of the at least one fuel jet.

In accordance with another aspect of the disclosure, another ducted combustion system is disclosed. The ducted combustion system may include a combustion chamber, which is defined as an enclosure bound at a first end by a flame deck surface of a cylinder head of an internal combustion engine and bound at a second end by a piston top surface of a piston disposed within the internal combustion engine. The system may further include a fuel injector in fluid connection with the combustion chamber and including a plurality of orifices opening from an injector tip of the fuel injector, the plurality of orifices injecting fuel into the combustion chamber a plurality of fuel jets. The system may further include a duct structure defining a plurality of ducts and disposed within the combustion chamber between the flame deck surface and the piston top surface, the plurality of ducts being disposed such that each of the plurality of fuel jets at least partially enters one of the plurality of ducts upon being injected into the combustion chamber. The system may further include a duct cooling system configured to cool a mixture of fuel and air of the at least one fuel jet of the plurality of fuel jets.

In accordance with yet another aspect of the disclosure, a method for operating a combustion system is disclosed. The method may include injecting a fuel jet into a combustion chamber of an internal combustion engine, the combustion chamber defined as an enclosure bound at a first end by a flame deck of a cylinder of an internal combustion engine, and bound at a second end by a piston top surface of a piston disposed within the internal combustion engine. The method may further include directing the fuel jet, at least partially, into a duct to provide a substantially uniform mixture of fuel and air within the fuel jets. The method may further include cooling the substantially uniform mixture of fuel and air within the duct while the fuel jet is in the duct.

Other features and advantages of the disclosed systems and principles will become apparent from reading the following detailed disclosure in conjunction with the included drawing figures.

BRIEF DESCRIPTION OF THE DRAWINGS

FIG. 18 is an example fuel jet having a flame lift-off length during combustion.

FIG. 19 is an example fuel jet having a flame lift-off length during combustion, the example fuel jet being injected through a duct.

FIG. 20 is an example fuel jet having a flame lift-off length during combustion, the example fuel jet being injected through a duct, the duct having a length optimized such that the flame has an equivalence ratio of less than 2 at the flame lift-off length.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
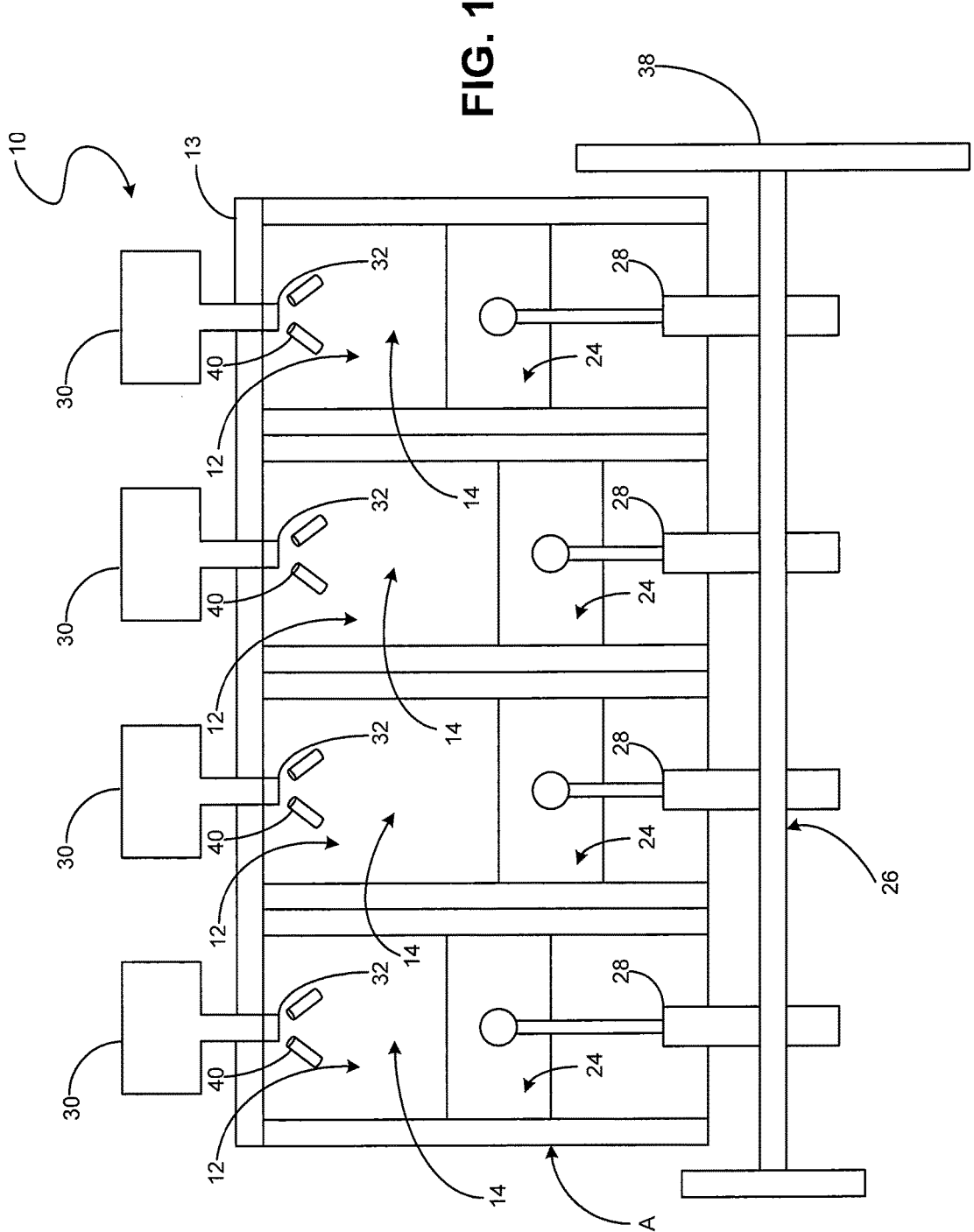
FIG. 1 is a side cross-sectional view of an internal combustion engine, in accordance with an embodiment of the present disclosure.

Turning now to the drawings and with specific reference to FIG. 1, a combustion engine 10 is shown. The engine 10 may be an internal combustion engine having a plurality of cylinders 12. For example, the cylinders 12 may be defined as cylinder bores within an engine block 13 of the engine 10. Each of the plurality of cylinders 12 includes a combustion chamber 14. Each combustion chamber 14 may have a generally cylindrical shape, in accordance with the general shape of the cylinder 12.

Figure 2:
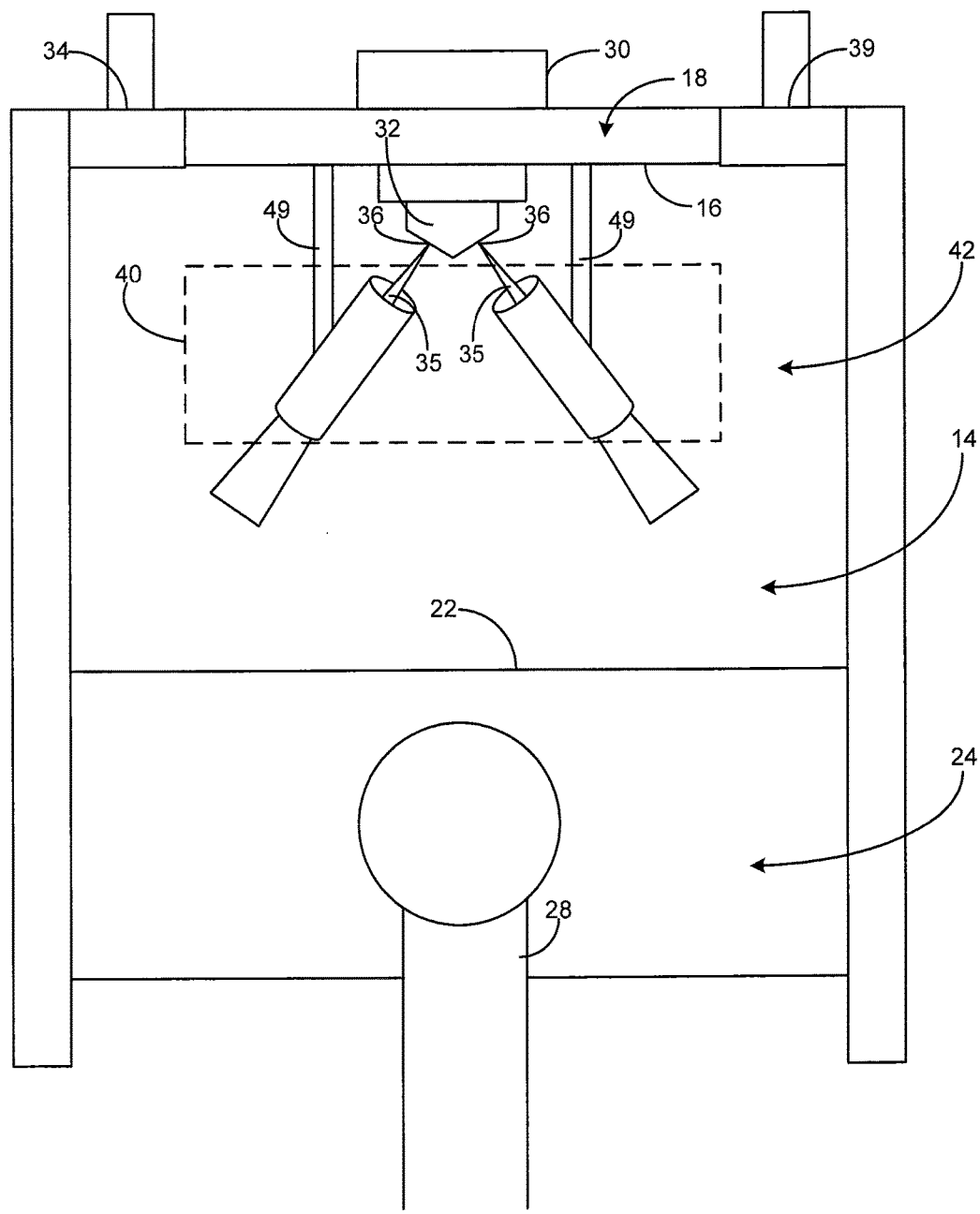
FIG. 2 is a front, cross-sectional view of a cylinder of the internal combustion engine of FIG. 1, as shown taken from the reference notation "A" of FIG. 1, in accordance with the present disclosure.

The combustion chamber 14 is shown in greater detail in the front, cross-sectional view of FIG. 2. As shown in FIG. 2, and with continued reference to FIG. 1, the combustion chamber 14 may be bound at one end by a flame deck surface 16 of a cylinder head 18 of each cylinder 12. The combustion chamber 14 may be further bound at a second end by a piston top surface 22 of a piston 24. The piston 24 is reciprocally disposed within the bore and, as shown in FIG. 1, is connected to a crankshaft 26 via a connecting rod 28. A fuel injector 30 is in fluid connection with the combustion chamber 14 and may be mounted in the cylinder head 18. The fuel injector 30 includes a tip 32 that protrudes into the combustion chamber 14 through the flame deck surface 16. Therefore, the fuel injector 30, via the tip 32, can directly inject fuel into the combustion chamber 14 as, for example, one or more fuel jets.

During operation of the engine 10, air enters the combustion chamber 14 via one or more intake valves 34 (shown in FIG. 2). Air is able to enter the combustion chamber 14 when the air intake valves 34 are open, generally, during an intake stroke and/or at the end of an exhaust stroke and/or at the beginning of a compression stroke. When air is present in the combustion chamber 14, the fuel injector 30, via the tip 32, will inject high pressure fuel through orifices 36 of the tip 32 as fuel jets 35. The fuel jets 35 may generally disperse within the combustion chamber 14 to create a fuel/air mixture within the combustion chamber 14. Ignition produces combustion, which, in turn, provides work on the piston 24 to produce motion upon the crankshaft 26 to drive an output 38. Following combustion, exhaust gas may be expelled from the combustion chamber 14 via one or more exhaust valves 39, when said exhaust valves 39 are open during an exhaust stroke and/or at the end of a power stroke and/or at the beginning of an intake stroke of the engine 10.

Within the combustion chamber 14, uniformity of the fuel/air mixture may be relevant to the combustion efficiency and may be relevant to the amount and type of combustion byproducts that are formed. For example, if the fuel/air mixture is too rich in fuel due to insufficient mixing within the fuel jets 35, then higher soot emissions may occur within the combustion chamber 14 and/or combustion efficiency may be affected. However, using one or more ducts 40 disposed within the combustion chamber 14 may provide for more uniform fuel/air mixing within the fuel jets 35. By using one or more ducts 40, a lift-off length of a flame associated with a fuel jet 35 may be altered (extended or reduced) to achieve an optimized lift-off length. The one or more ducts 40 may alter lift-off length due to energy exchange between the one or more ducts 40 and the fuel/air mixture of the fuel jet 35, due to altering fluid dynamics of the fuel/air mixture of the fuel jet 35, and/or due to prevention of lift-off length recession by acting as a flame arrester.

The one or more ducts 40 may be disposed within a flame region 42 of the combustion chamber 14. The flame region 42 may be defined as a region of the combustion chamber 14 extending from the flame deck surface 16 to the piston top surface 22, when the piston 24 is at or close to a maximum compression distance or top dead center (TDC) position.

Figure 3:
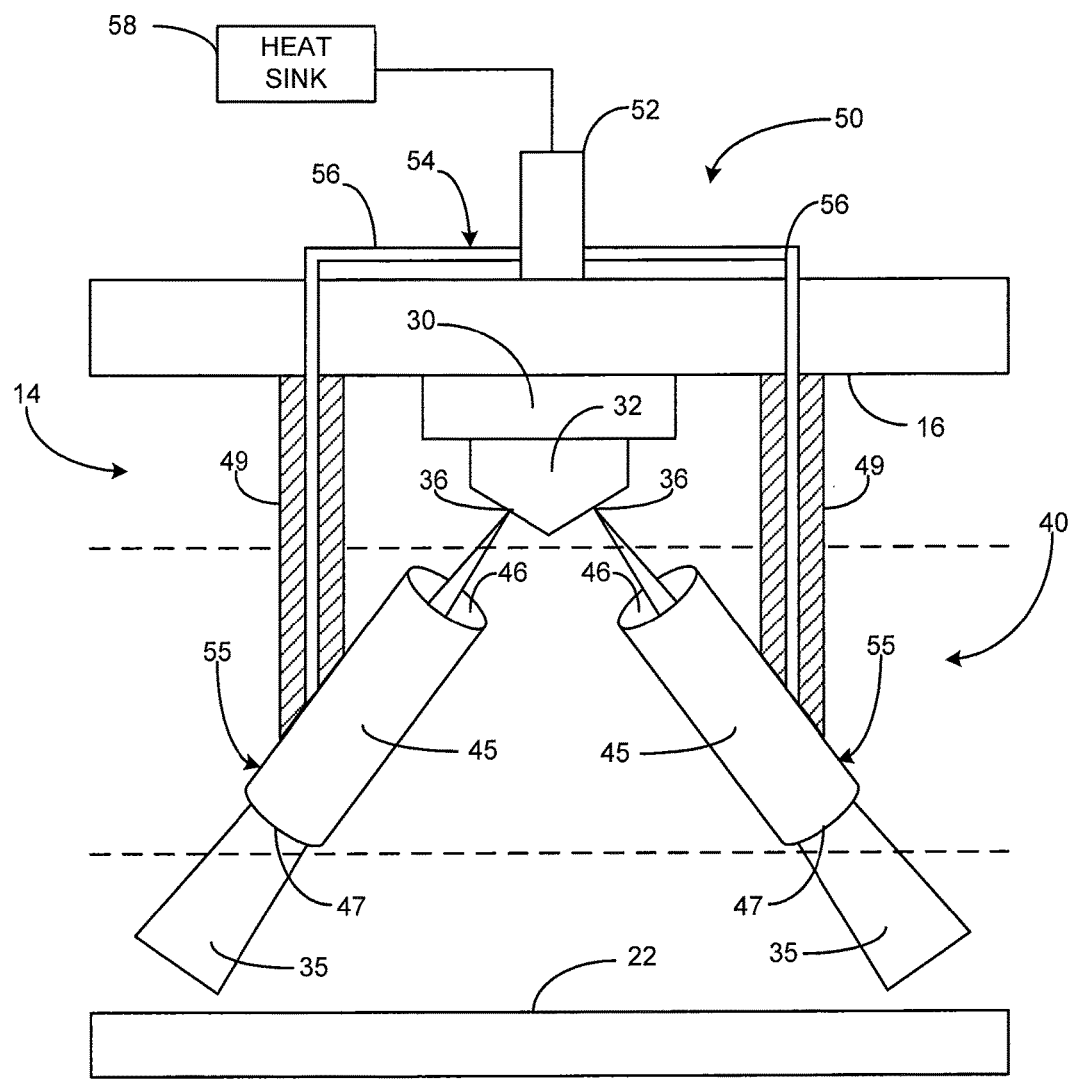
FIG. 3 is a side view of one or more ducts and an associated duct cooling system for use within the cylinder(s) of FIGS. 1 and 2, in accordance with an embodiment of the disclosure.

To further illustrate the one or more ducts 40 and their interaction with one or more fuel jets 35 injected from the one or more orifices 36 of the tip 32 of the fuel injector 30, the ducts 40, within the combustion chamber 14, are shown in greater detail in FIG. 3. The one or more ducts 40 may be duct structures 45, as shown. Upon being injected out of the one or more orifices 36, the fuel jets 35 may, at least partially, enter the ducts 40 at duct openings 46 and may flow through the ducts 40 to duct outlets 47. In some examples, the ducts 40 may be positioned and/or supported within the combustion chamber 14 by a support structure 49. The support structure 49 may be any mounting suitable for positioning the ducts 40 within the combustion chamber 14.

Use of the ducts 40 may provide improved mixing of a fuel/air mixture within the fuel jets 35. Further, by channeling the fuel jets 35 into the ducts 40, entrainment of combustion products from downstream regions of the same or neighboring fuel jets 35 may be inhibited or reduced. By using such ducts 40, levels of soot within the combustion chamber 14 may be reduced greatly. Additionally, the ducts 40 may direct combustion away from the fuel injector 30, such that longer flame lift-off lengths may be achieved.

Figure 4:
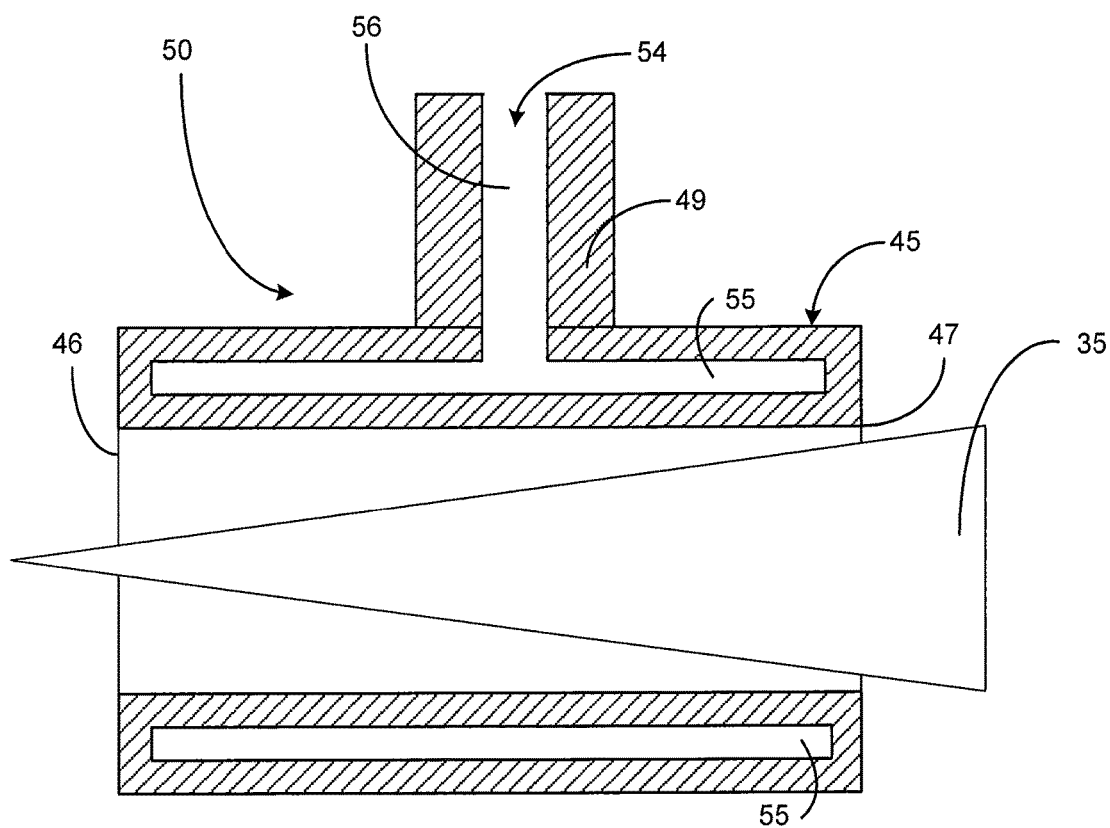
FIG. 4 is a side, cross-sectional view of one of the ducts and the duct cooling system of the embodiment of FIG. 3, in accordance with the embodiment of FIG. 3 and the present disclosure.

Flame lift-off lengths may further be altered by using a duct cooling system 50, as illustrated in FIGS. 3 and 4. The duct cooling system 50 may include a coolant source 52 for providing a coolant 54 to the duct structures 45 via duct cooling passages 55, which may be defined by the structure of the duct structure(s) 45. Additionally, the duct cooling passages 55 may allow the coolant 52 to flow away from the duct structures 45, for heat transfer purposes (e.g., transporting the coolant 52 to an optional heat sink). The duct cooling passages 55, as best shown in FIG. 4, may be any void within the interior of the structure of the duct structure(s) 45. While the duct cooling passages 55 are shown as extending, circumferentially, about the interior of the duct structure 45, the duct cooling passages 55 may be defined as any passage within the duct structure 45. The duct cooling passages 55 may be in fluid communication with connective cooling passages 56, which may be defined by the structure the duct support structure 49. In some examples, the coolant 54 and/or the coolant source 52 may be associated with a heat sink 58.

For providing the coolant 54, the coolant source 52 may be any reservoir, outside source, internal source, or the like, which may provide the coolant 54 to the ducts 40. For example, the coolant source 52 may be a connection between the duct cooling system 50 and a larger cooling system for the engine 10, as a whole. Alternatively, the coolant source 52 may be independent of a cooling system for the engine 10 and may be specific to one or more of the cylinders 12. The coolant 54 may be any coolant, generally in a liquid form, which can be used to reduce the temperature of engine 10 components. The coolant 54 may include, but is certainly not limited to including, one or more of engine coolants, anti-freeze, ethylene glycol, water-based coolants, and the like. In some examples, the coolant 54 may transfer heat absorbed from the ducts 40 to the heat sink 58, thereby allowing the coolant 54 to absorb more heat and properly cool the duct(s) 40.

The coolant 54 may reach the duct cooling passages 55 of the duct structure(s) 45 via the connective cooling passages 56. The connective cooling passages 56 may be any fluid connection between the coolant source 52 and the duct cooling passages 55, such as, for example, any kind of void within the duct support structure 49. Additionally, such a void defining the connective cooling passages 56 may include any form of piping, tubing, coating, or other structure for aiding in the flow of the coolant 54 in to and out of the duct cooling passages 55.

Use of the duct cooling system 50, and any other duct cooling system described below, may be useful in optimizing the flame-lift off lengths associated with the fuel jets 35. The duct cooling system 50 may lower the temperatures of surfaces of the ducts 40 and/or any interior space defined within the ducts 40 and, thereby, cools the fuel/air mixture within the ducts 40. Flame lift-off lengths may increase in response to decreases in ambient temperature; therefore, a decrease in temperature proximate to the duct 40 may cool the fuel jets 35 and, thereby, increase the flame lift-off length of the fuel jets 35. Increases in flame lift-off lengths may be associated with decreases in soot within the combustion chamber 14.

Figure 5:
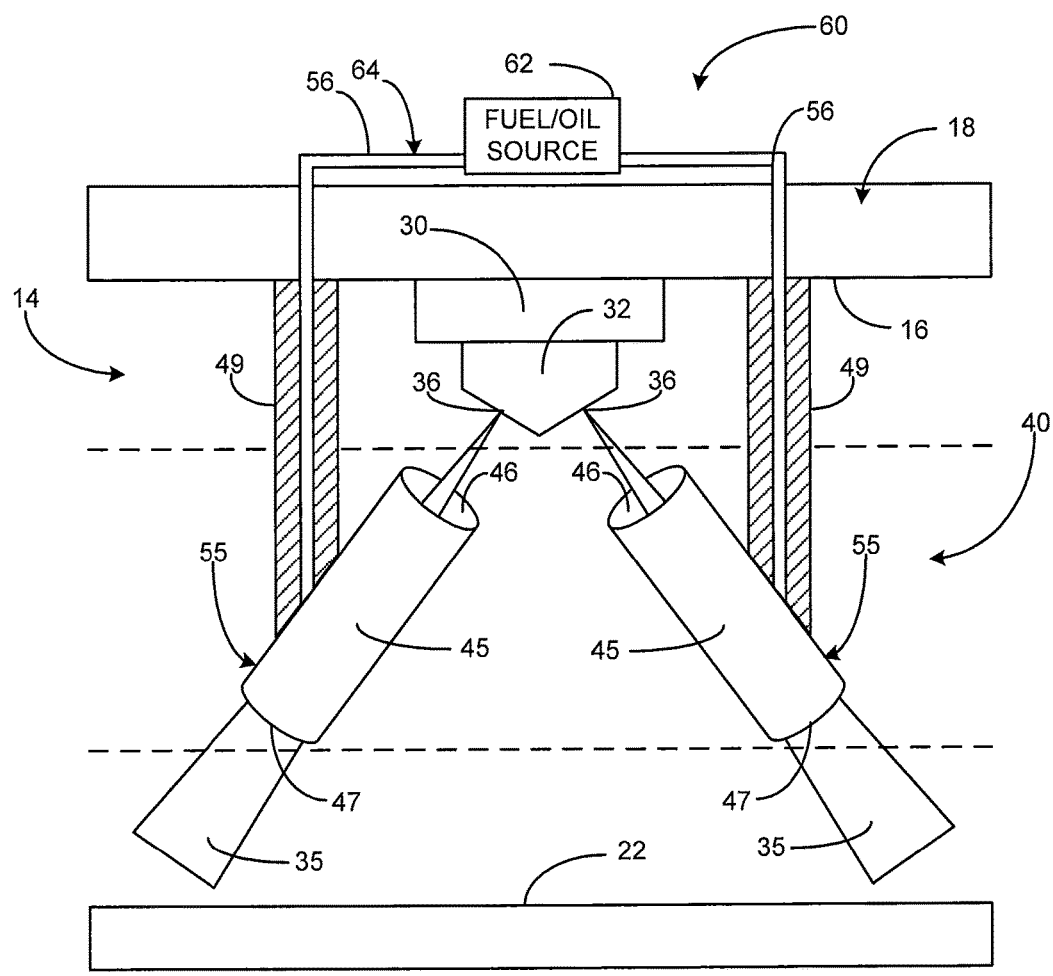
FIG. 5 is a side view of one or more ducts and an associated duct cooling system, the duct cooling system utilizing fuel and/or oil, for use within the cylinder(s) of FIGS. 1 and 2, in accordance with another embodiment of the disclosure.

Turning now to FIG. 5, another duct cooling system 60 is shown, which shares many like elements of the duct cooling system 50 of FIGS. 3 and 4. The duct cooling system 60 may include a fuel/oil source 62 for providing one or both of fuel and oil to the duct structures 45 as a fuel/oil coolant 64. The fuel/oil coolant 64 may be delivered to the duct cooling passages 55, for example, by connecting the fuel/oil source 62 to the connective cooling passages 56. The fuel/oil source 62 may be any source of fuel and/or oil, such as a tap into a fuel source associated with the fuel injector 30 or a direct line to a fuel source for the engine 10, as a whole. The fuel/oil source 62 may include any additional source of fuel and/or oil, such as, but not limited to engine oil sources, transmission oil sources, and the like.

The fuel/oil coolant 64 has a much lower temperature than that of ignited fuel within the combustion chamber 14. Therefore, it can absorb heat produced proximate to the ducts 40 and aid in cooling the ducts 40 using the duct cooling system 60. Because fuel and/or oil is readily available due to the ducts 40 and/or support structure 49 being in close proximity to the fuel injector 30, using the fuel/oil coolant 64 may be advantageous.

Figure 6:
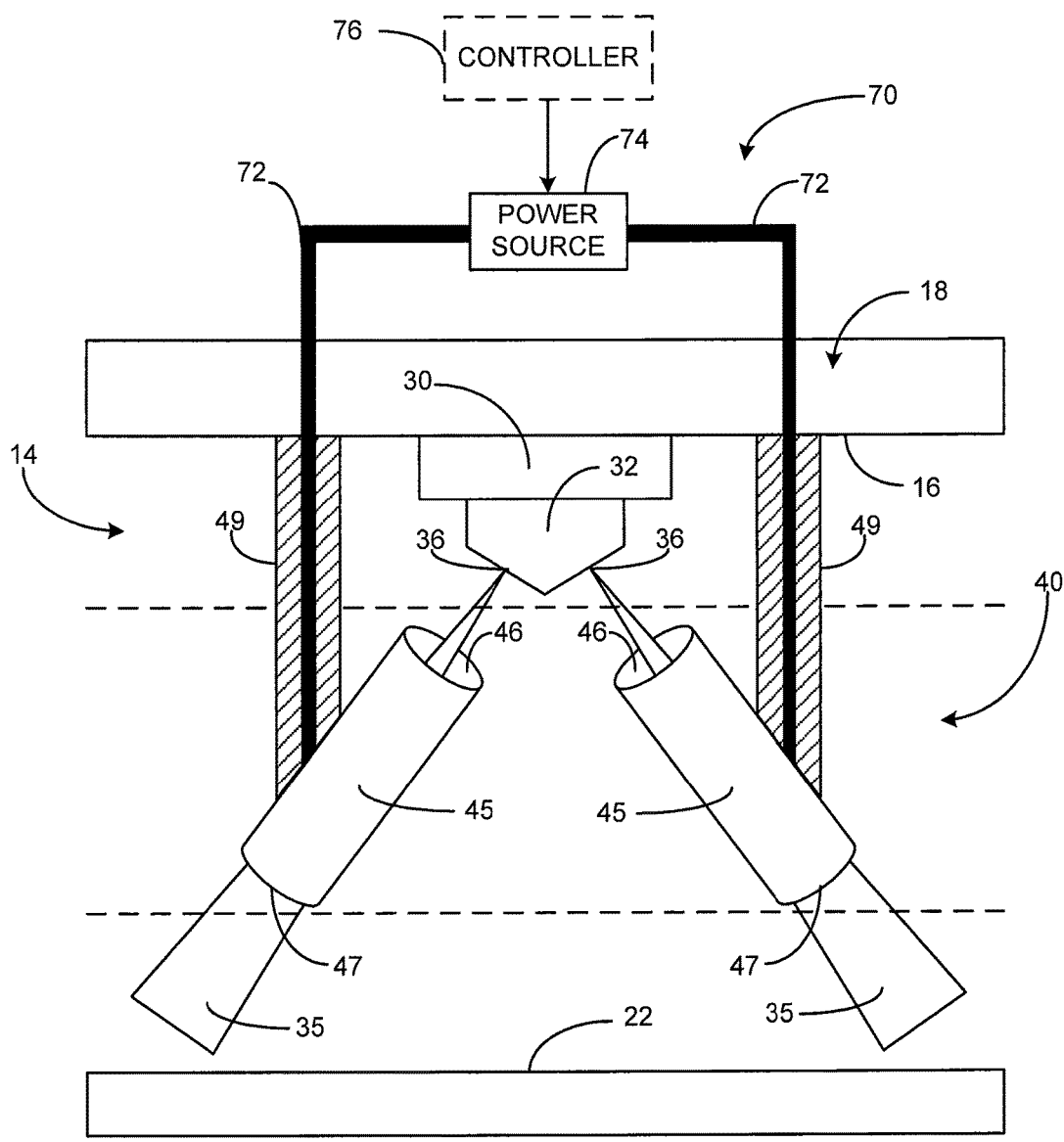
FIG. 6 is a side view of one or more ducts and an associated duct cooling system, the duct cooling system utilizing thermoelectric cooling, for use within the cylinder(s) of FIGS. 1 and 2, in accordance with yet another embodiment of the disclosure.

Yet another example of a duct cooling system 70 is illustrated in FIG. 6. The duct cooling system 70 may include thermoelectric cooling elements 72 configured to electrically cool the ducts 40. The thermoelectric cooling elements 72 may be any element which transfers heat by using electrical energy. Example thermoelectric cooling elements 72 include, but are not limited to including, a Peltier device, a Peltier heat pump, a solid state refrigerator, a thermoelectric cooler, and/or any other device known in the art for using electricity for cooling.

The thermoelectric cooling elements 72 may receive electricity from a power source 74. The power source 74 may be any element for providing power to the thermoelectric cooling elements 72, such as, but not limited to, a battery, a generator, a connection to a power source of the engine 10, and the like. In some examples, the output of the power source and, therefore, the cooling levels of the thermoelectric cooling elements 72 may be controlled by a controller 76, which may be any processor, microcontroller, computer, or other controlling element associated with the engine 10.

Each thermoelectric cooling element 72 is associated with a duct structure 45. In some examples, the thermoelectric cooling element 72 may be associated with the duct support structure 49. In such examples, the thermoelectric cooling elements 72 may be embedded within or otherwise affixed to or attached to the duct support structure 49. Additionally or alternatively, the thermoelectric cooling elements 72 may be in contact with and/or embedded within the duct structures 45. For example, the thermoelectric cooling elements 72 could extend into a passage within the duct structures 45 (e.g., the duct cooling passages 55 of FIGS. 3-5).

By utilizing thermoelectric cooling with the duct cooling system 70, the ducts 40 may be cooled using preexisting power sources associated with the engine 10. Thermoelectric cooling by the duct cooling system 70 may lower the temperatures within the ducts 40, proximate to the ducts 40, and within the fuel/air mixture of the fuel jets 35. By utilizing the duct cooling system 70, increased flame lift-off lengths for the fuel jets 35 may be achieved.

Figure 7:
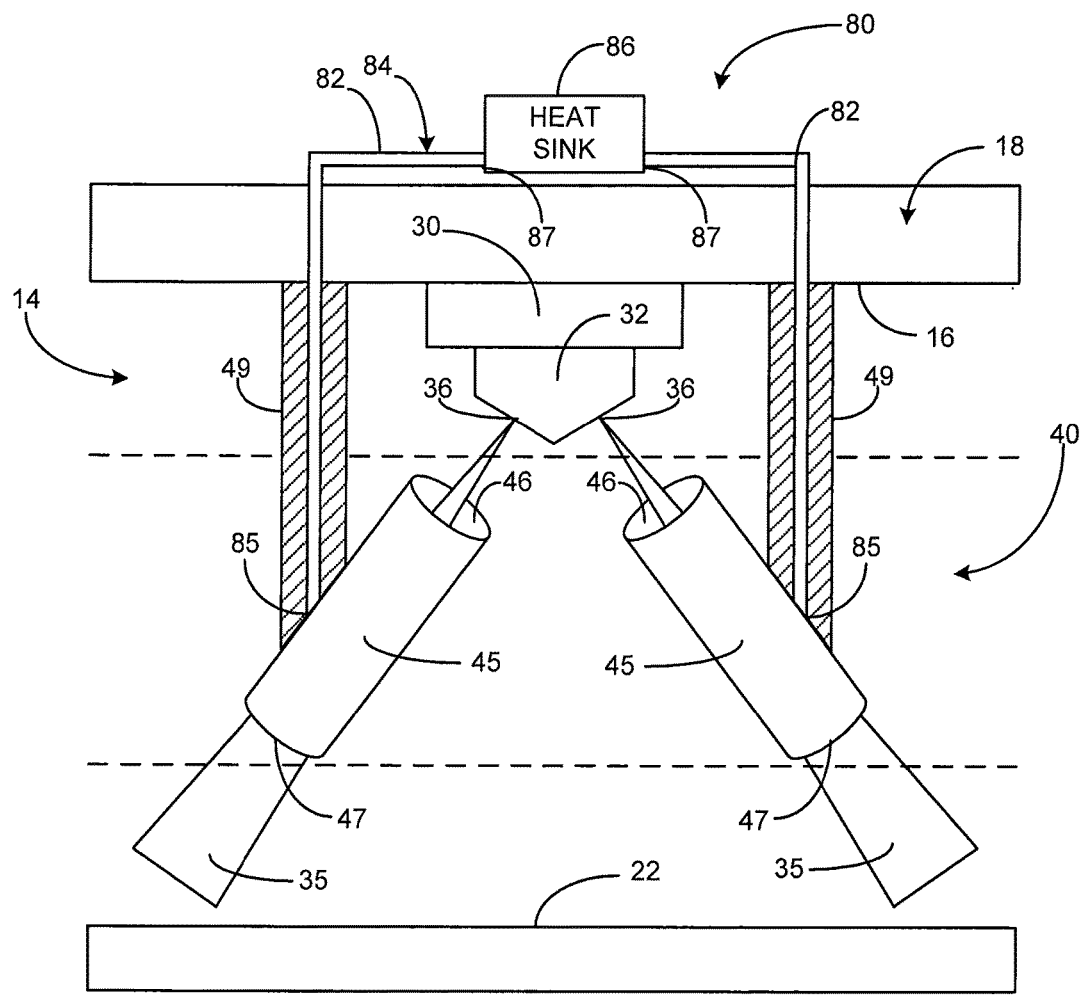
FIG. 7 is a side view of one or more ducts and an associated duct cooling system, the duct cooling system utilizing heat pipes, for use within the cylinder(s) of FIGS. 1 and 2, in accordance with yet another embodiment of the disclosure.

Further cooling of the ducts 40 may be achieved by using a duct cooling system 80, as shown in FIG. 7. The duct cooling system 80 may utilize heat pipes 82 and a heat sink 84 associated with the heat pipes 82 to cool the ducts 40 and/or the air/fuel mixture within and/or proximate to the ducts 40. The heat pipes 82 may be filled with fluid, in both a pure liquid form and a pure vapor form of said fluid. For example, the fluid may include a methanol-based fluid, which has a low boiling point, and/or the fluid may include a water-based fluid. Heat may be input to the heat pipes 82 (for example, proximate to the duct 40) at a first end 85 of the heat pipes 82. Input of the heat may evaporate part of the liquid portion of the internal fluid of the heat pipe 82.

In a non-limiting example heat pipe 82 wherein heat enters the heat pipe 82 at the first end 85, the heat pipe 82 may be, functionally, divided into condensation, adiabatic, and evaporation sections. When heat is input at the first end 85, the heat that is input evaporates liquid stored in the wick into a vapor. To remove heat, the vapor travels down the adiabatic section to reach the condensation section. At the condensation section, the vapor condenses into liquid and recedes, or soaks into, the wick. Surface tension on the liquid in the wick pulls the liquid through the wick from the condensation section, through the adiabatic section, and to the evaporation section. There, the liquid can be evaporated into vapor to further transfer heat from the first end 85 to the second end 87, which may be proximate to the heat sink 86.

By utilizing heat pipes 82 in the duct cooling system 80, heat can be transferred away from the duct structures 45, thereby cooling the duct structures 45 and the proximate area. As such, the fuel air/mixture of the fuel jets 35 may be cooled, reducing the flame lift-off length.

Figure 8:
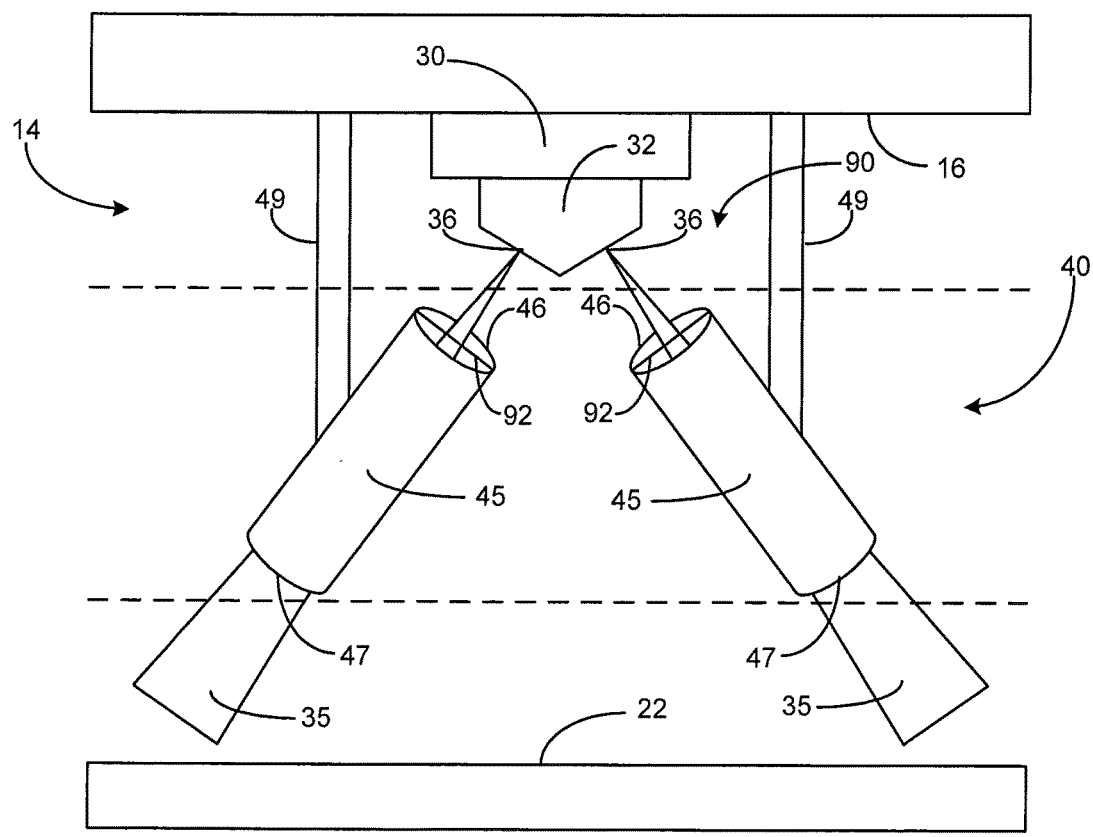
FIG. 8 is a side view of one or more ducts and an associated duct cooling system, the duct cooling system utilizing one or more trip wires, for use within the cylinder(s) of FIGS. 1 and 2, in accordance with yet another embodiment of the disclosure.
Figure 9:
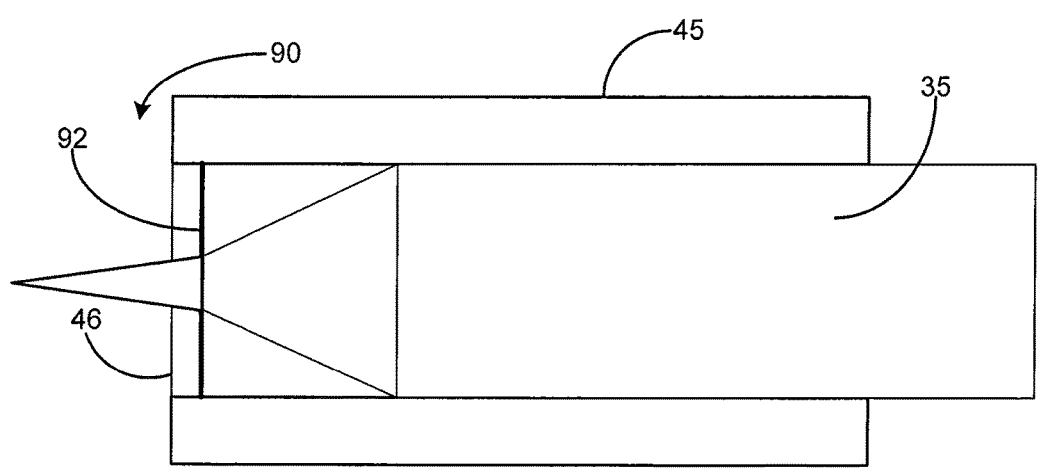
FIG. 9 is a side, cross-sectional view of one of the ducts and the duct cooling system of the embodiment of FIG. 8, in accordance with the embodiment of FIG. 8 and the present disclosure.

Other systems for cooling the ducts 40 and/or the fuel jets 35 may be employed, such as a trip wire based duct cooling system 90 of FIGS. 8 and 9. The duct cooling system 90 of FIGS. 8 and 9 may include one or more trip wires 92, each trip wire 92 disposed proximate to the opening 46 of one of the duct structures 45. The trip wire 92 may be any structure disposed at the openings 46 which may increase the cone angle of the fuel jet 35 within the duct structure 45, as shown in FIG. 9. In some examples, the one or more wires 92 may be disposed as and/or configured as a mesh structure at the opening 46 of the duct structure 45. By spreading the cone angle of the fuel jet 35, the fuel/air mixture may be more evenly distributed throughout the duct structure 45, and the fuel/air mixture may be better mixed. By cooling the ducts 40 and/or the fuel/air mixture, increased flame lift-off lengths may be achieved.

Figure 10:
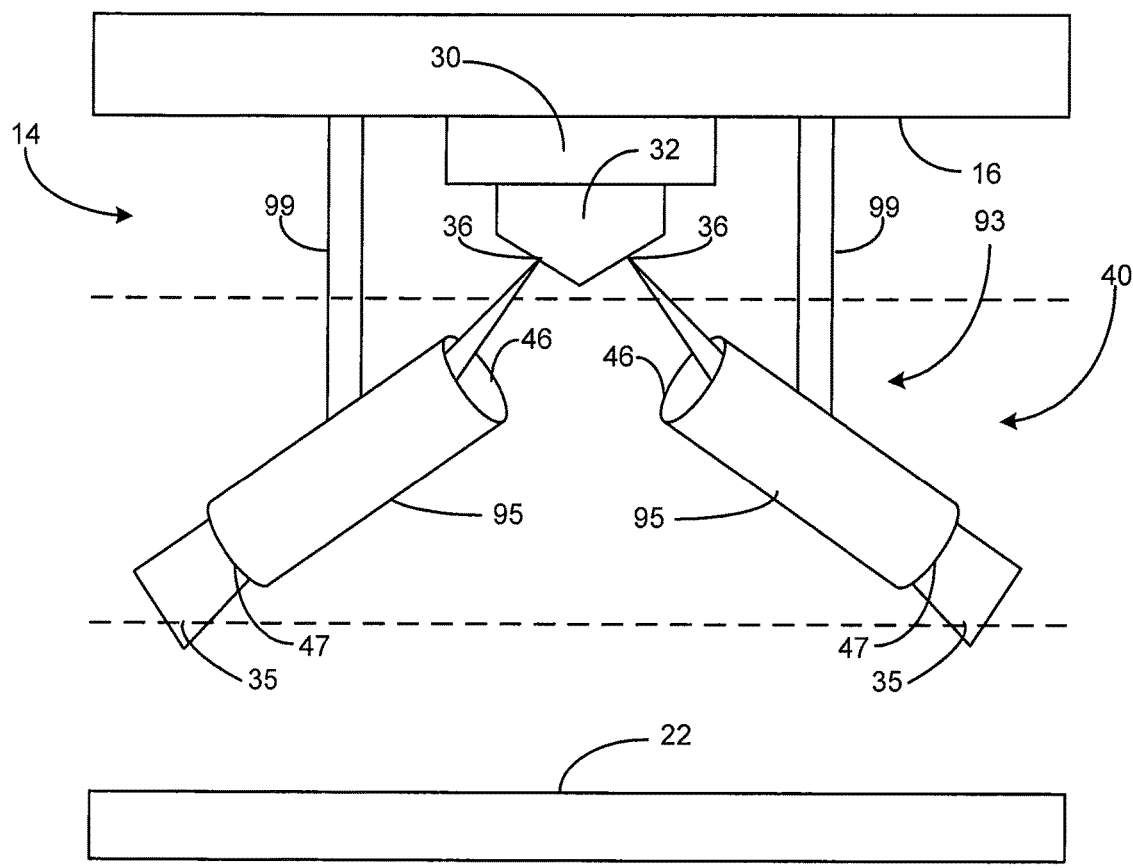
FIG. 10 is a side view of one or more ducts and, the one or more ducts being angled such that they do not share a common center axis with a fuel jet, for use within the cylinder(s) of FIGS. 1 and 2, in accordance with yet another embodiment of the disclosure.
Figure 11:
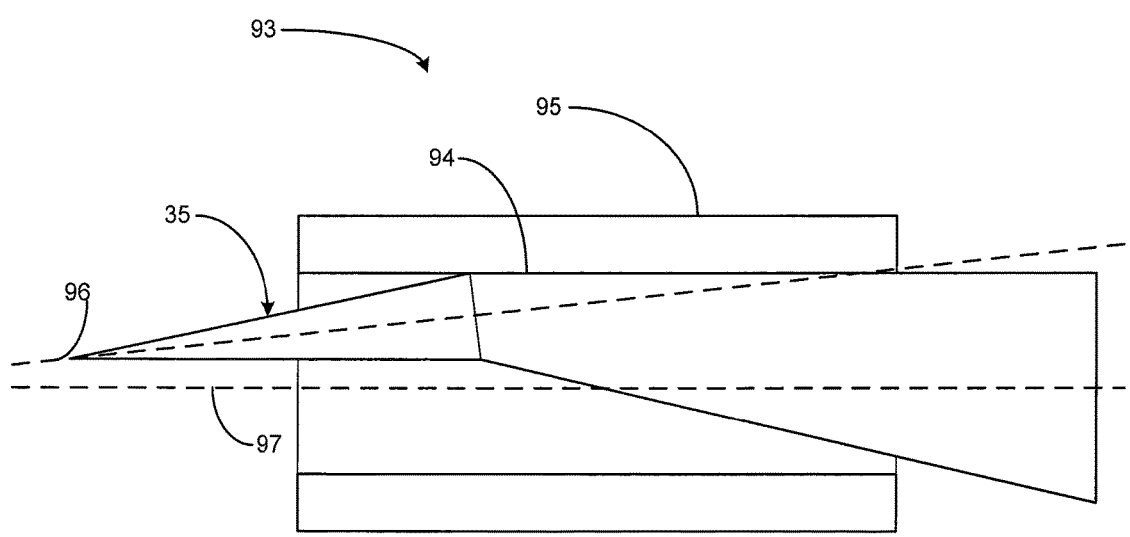
FIG. 11 is a side, cross-sectional view of one of the ducts and the duct cooling system of the embodiment of FIG. 10, in accordance with the embodiment of FIG. 10 and the present disclosure.

To similarly distribute the fuel jet 35 and, thereby, cool the ducts 40, an alternative duct cooling system 93 may be used, as illustrated in FIGS. 10 and 11. In the embodiment of FIGS. 9 and 10, the one or more ducts 40 may include one or more tilted duct structures 95. By using tilted duct structures, as positioned by a tilting support structure 99, a duct center axis 97 of the tilted duct structures 95 may be not co-axial with a jet center axis 96 of the fuel jets 35. Because the duct center axis 97 and jet center axis 96 are not co-axial, the fuel jet 35 may contact a duct wall 94 within the tilted duct structure 95 and, therefore, disperse in a widening manner within the jet. As with the use of the trip wire 92, this arrangement will spread the spray of the fuel jet 35 at an early point within the tilted duct structure 95, thereby distributing the fuel jet 35 within the tilted duct structure 95. This, in turn, may cool the air/fuel mixture within the tilted duct structure 95, leading to increases in flame lift-off length.

Figure 12:
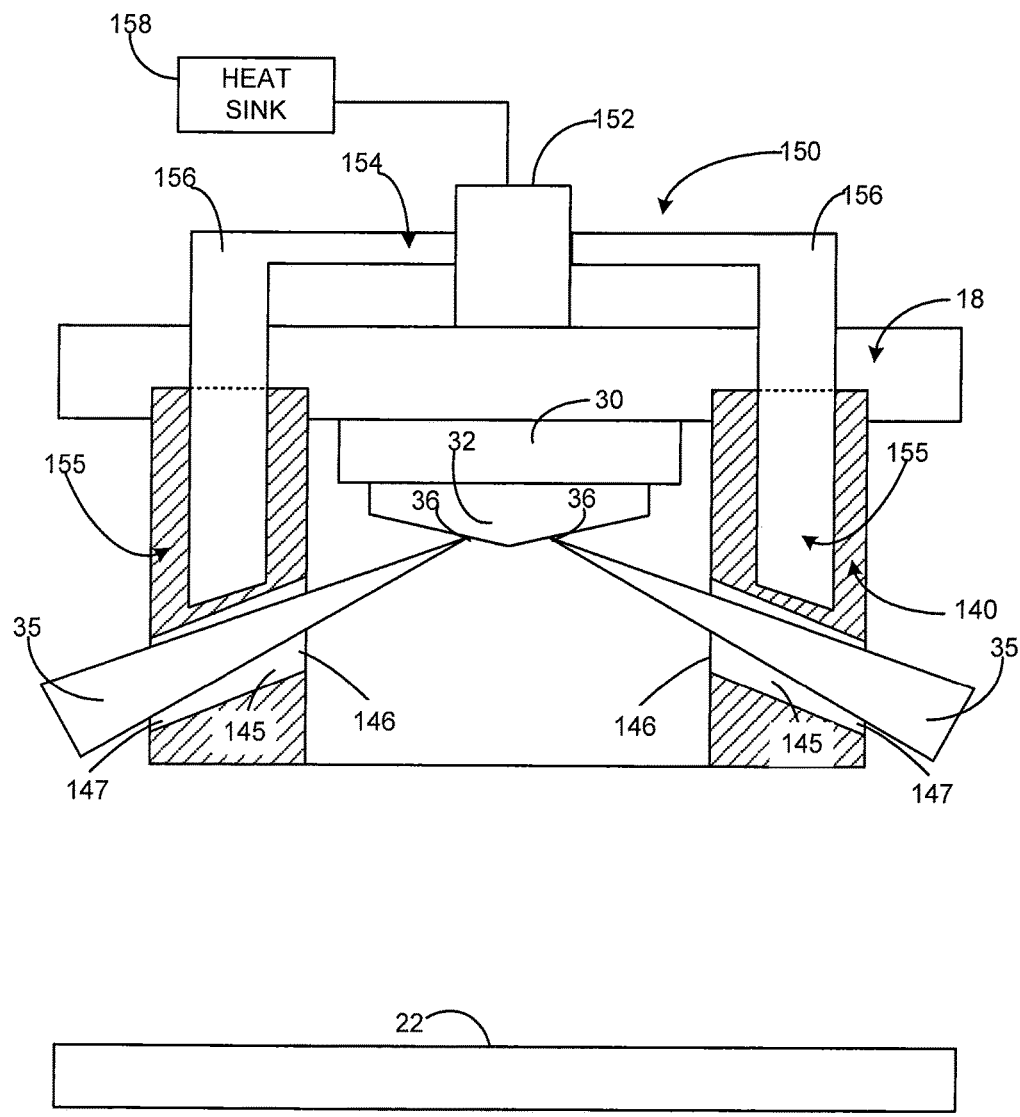
FIG. 12 is a side view of a duct structure and an associated duct cooling system for use within the cylinder(s) of FIGS. 1 and 2, in accordance with an embodiment of the disclosure.

Turning now to FIG. 12, an example embodiment of a duct structure 140, which may be used in conjunction with the cylinder 12 and combustion chamber 14 of the engine 10, is shown. The duct structure 140 defines a plurality of ducts 145 and may be disposed within a flame region 42 of the combustion chamber 14. As shown, the ducts 145 are defined within the duct structure 140 as, for example, bores within the duct structure 140. Upon being injected out of the one or more orifices 36, the fuel jets 35 may enter the ducts 145 at duct openings 146 and may flow through the ducts 145 to duct outlets 147.

Similar to the ducts 40 discussed above, the ducts 145 of the duct structure 140 may provide for more uniform fuel/air mixing within fuel jets 35. Using such a duct structure 140, which defines a plurality of ducts 145, a lift-off length of a flame associated with a fuel jet 35 may be altered (extended or reduced) to achieve an optimized lift-off length.

Flame lift-off lengths may further be altered by using a duct cooling system 150. The duct cooling system 150 may include a coolant source 152 for providing a coolant 154 to the duct structure 140 via duct cooling passages 155, which may be defined by the structure of the duct structure(s) 140. The duct cooling passages 155 may be configured such that they provide the coolant 154 to the duct structure 140 in locations proximate to the ducts 145 of the duct structure 140, thereby cooling the ducts 145 and the areas proximate to the ducts 145. The duct cooling passages 155 may be any void within the interior of the duct structure 140. The duct cooling passages 155 may be defined as any passage within the duct structure 140.

Additionally, the duct cooling passages 155 may be in fluid communication with connective cooling passages 156, which may be defined by, for example, the cylinder head 18, such that the connective cooling passages 156 connect the coolant source 152 to the duct cooling passages 155. In some examples, the coolant 154 and/or the coolant source 152 may be associated with a heat sink 158.

For providing the coolant 154, the coolant source 152 may be any reservoir, outside source, internal source, or the like, which may provide a coolant to the duct structure 140. For example, the coolant source 152 may be a connection between the duct cooling system 150 and a larger cooling system for the engine 10, as a whole. Alternatively, the coolant source 152 may be independent of a cooling system for the engine 10 and may be specific to one or more of the cylinders 12. The coolant 154 may be any coolant, generally in a liquid form, which can be used to reduce the temperature of components of the engine 10. The coolant 154 may include, but is certainly not limited to including, one or more of engine coolants, anti-freeze, ethylene glycol, water-based coolants, and the like. In some examples, the coolant 154 may transfer heat absorbed from the duct structure 140 to the heat sink 158, thereby allowing the coolant 154 to absorb more heat and properly cool the duct structure 140.

Figure 13:
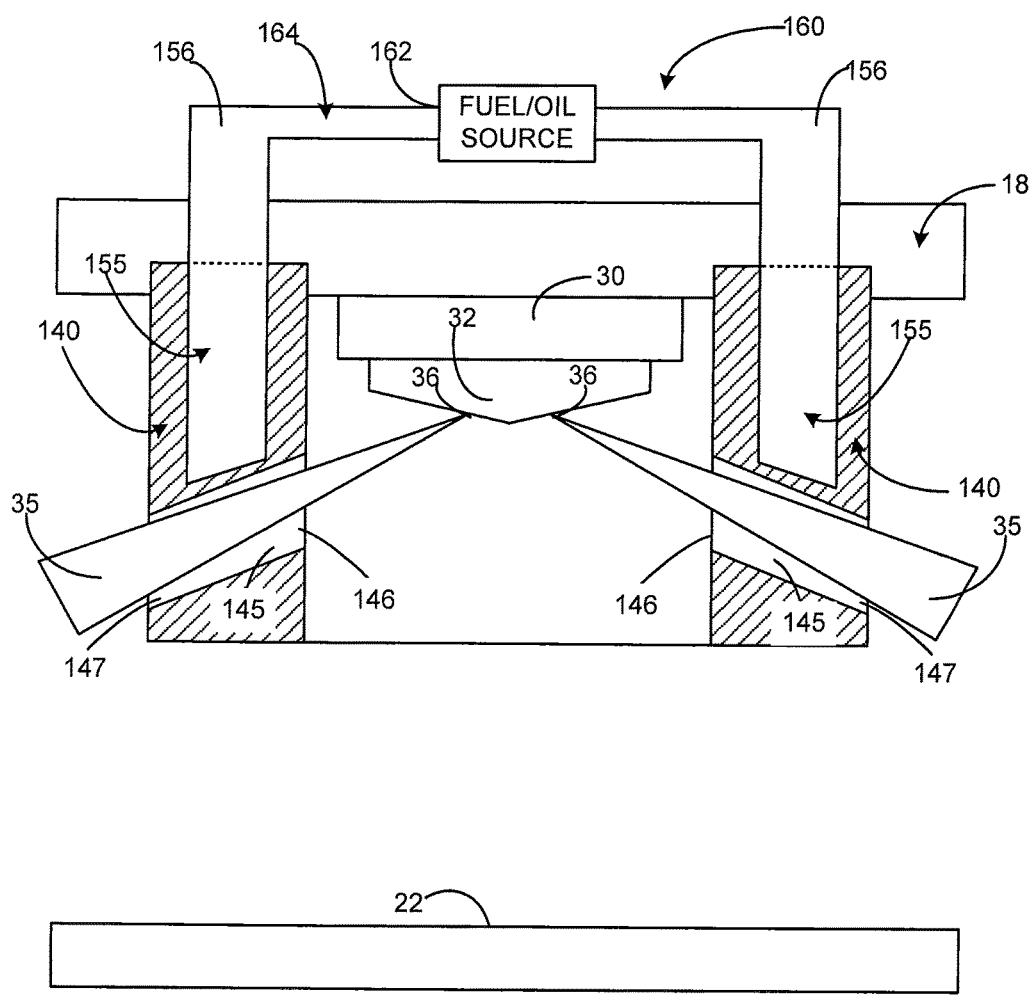
FIG. 13 is a side view of a duct structure and an associated duct cooling system, the duct cooling system utilizing fuel and/or oil, for use within the cylinder(s) of FIGS. 1 and 2, in accordance with another embodiment of the disclosure.

Turning now to FIG. 13, another duct cooling system 160 is shown, which shares many like elements of the duct cooling system 150 of FIG. 12. The duct cooling system 160 may include a fuel/oil source 162 for providing one or both of fuel and engine oil to the duct structure 140 as a fuel/oil coolant 164. The fuel/oil coolant 164 may be delivered to the duct cooling passages 155, for example, by connecting the fuel/oil source 162 to the connective cooling passages 156. The fuel/oil source 162 may be any source of engine fuel and/or engine oil, such as a tap into a fuel source associated with the fuel injector 30 or a direct line to a fuel source for the engine 10, as a whole. Because fuel and/or engine oil is readily available due to the duct structure 140 being in close proximity to the fuel injector 30, using the fuel/oil coolant 64 may be advantageous.

Figure 14:
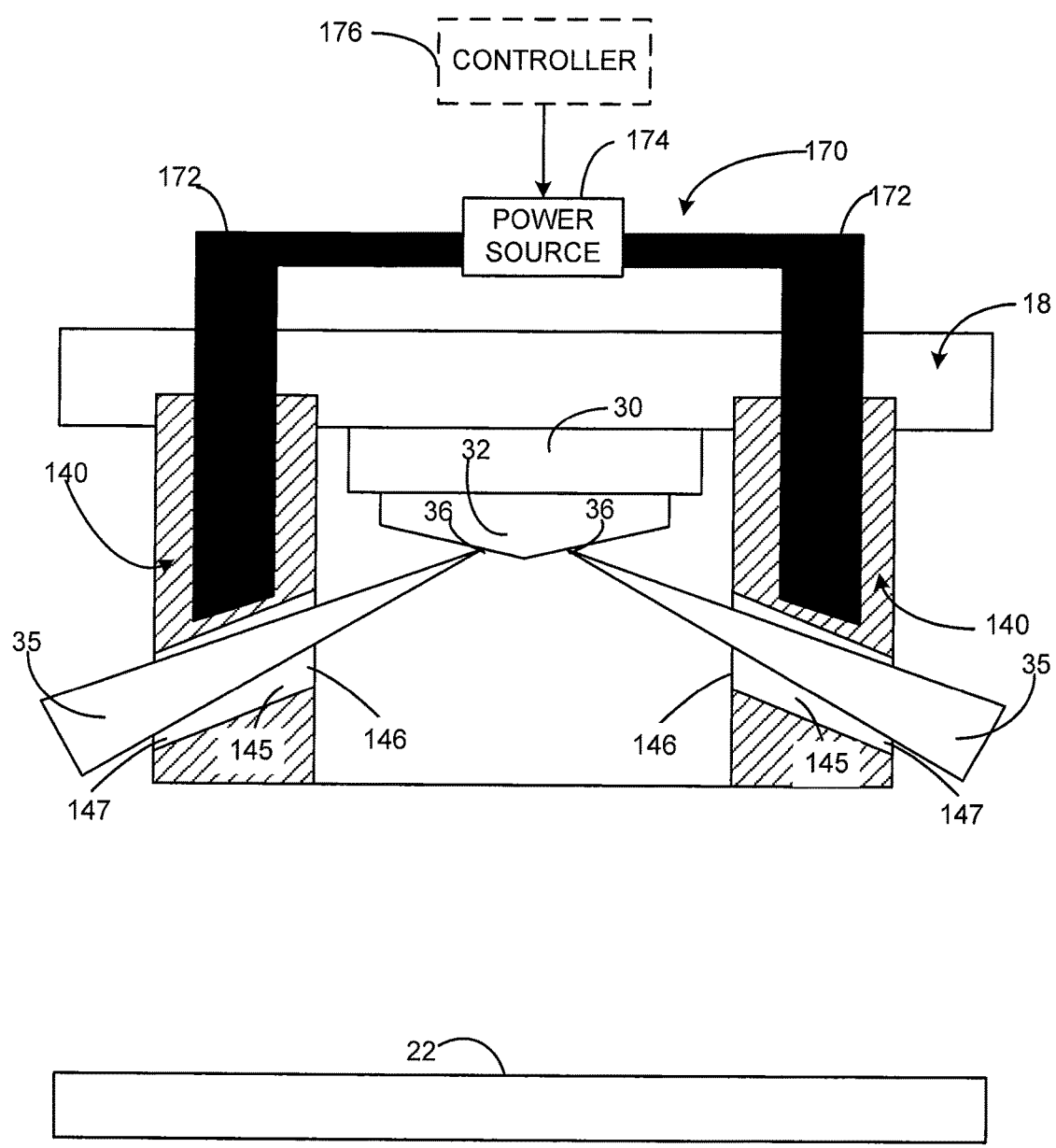
FIG. 14 is a side view of a duct structure and an associated duct cooling system, the duct cooling system utilizing thermoelectric cooling, for use within the cylinder(s) of FIGS. 1 and 2, in accordance with yet another embodiment of the disclosure.

Yet another example of a duct cooling system 170 is illustrated in FIG. 14. The duct cooling system 170 may include thermoelectric cooling elements 172 configured to electrically cool the duct structure 140. The thermoelectric cooling elements 172 may be any element which transfers heat by using electrical energy. Example thermoelectric cooling elements 172 include, but are not limited to including, a Peltier device, a Peltier heat pump, a solid state refrigerator, a thermoelectric cooler, and/or any other device known in the art for using electricity for cooling.

The thermoelectric cooling elements 172 may receive electricity from a power source 174. The power source 174 may be any element for providing power to the thermoelectric cooling elements 172, such as, but not limited to, a battery, a generator, a connection to a power source of the engine 10, and the like. In some examples, the output of the power source 174 and, therefore, the cooling levels of the thermoelectric cooling elements 172 may be controlled by a controller 176, which may be any processor, microcontroller, computer, or other controlling element associated with the engine 10.

Each thermoelectric cooling element 172 is associated with the duct structure 140. In some examples, the thermoelectric cooling element 172 may be built into or otherwise embedded within the duct structure 140. Additionally or alternatively, the thermoelectric element may be attached or otherwise affixed to the duct structure 140. For example, the thermoelectric cooling elements 172 could extend into a passage within the duct structure 140 (e.g., the duct cooling passages 155 of FIGS. 3-5).

Figure 15:
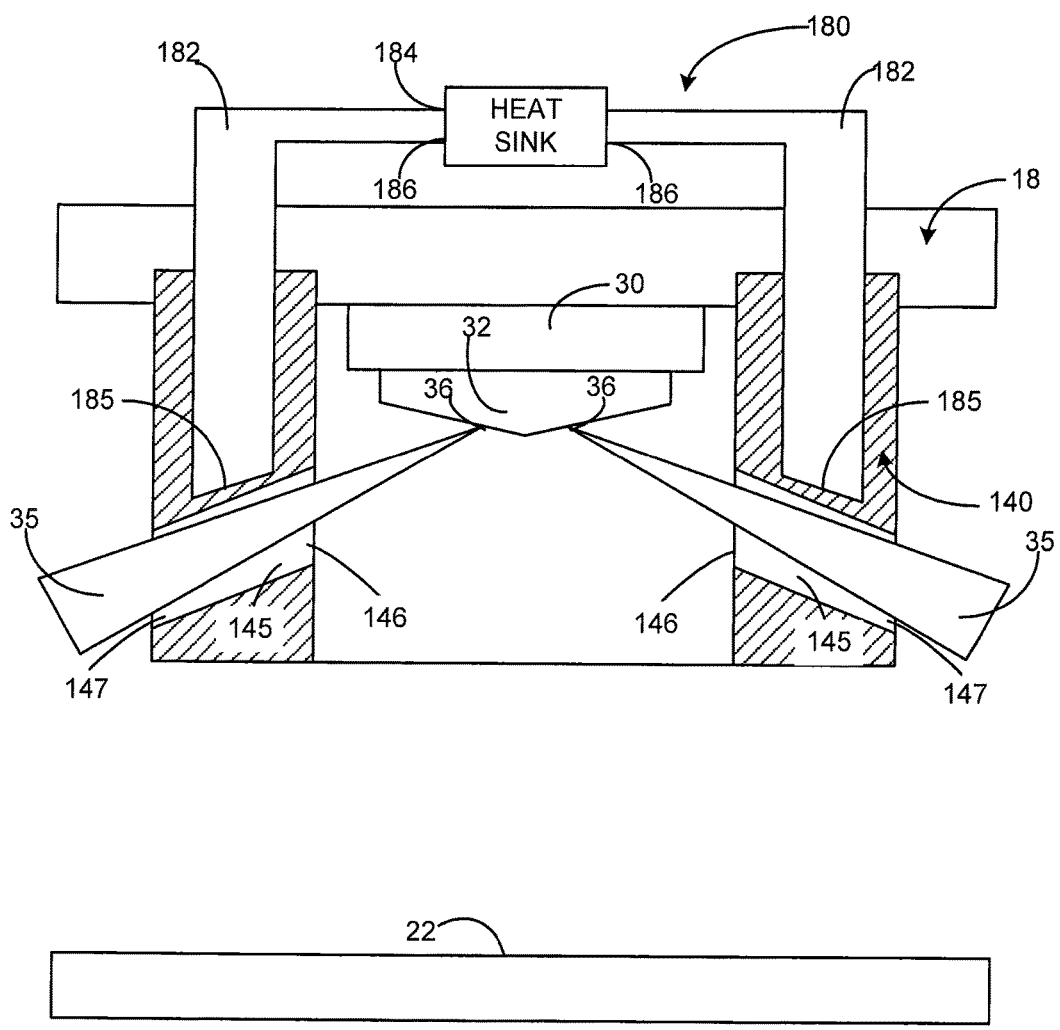
FIG. 15 is a side view of a duct structure and an associated duct cooling system, the duct cooling system utilizing heat pipes, for use within the cylinder(s) of FIGS. 1 and 2, in accordance with yet another embodiment of the disclosure.

Further cooling of the duct structure 140 may be achieved by using a cooling system 180, as shown in FIG. 15. The cooling system 180 may utilize heat pipes 182 and a heat sink 184 associated with the heat pipes 182 to cool the duct structure 140 and/or the air/fuel mixture within and/or proximate to the ducts 145. The heat pipes 182 may be filled with fluid, in both a pure liquid form and a pure vapor form of said fluid. For example, the fluid may include a methanol-based fluid, which has a low boiling point, and/or the fluid may include a water-based fluid. Heat may be input to the heat pipes 182 (for example, proximate to the duct 40) at a first end 185 of the heat pipes 182. Input of the heat may evaporate part of the liquid portion of the internal fluid of the heat pipe 182. In some examples, the liquid that is evaporated may be contained in a wick, which lines the interior of the heat pipe 182 adjacent to an outer shell of the heat pipes 182.

By utilizing heat pipes 182 in the duct cooling system 180, heat can be transferred away from the duct structures 145, thereby cooling the duct structures 145 and the proximate area. As such, the fuel air/mixture of the fuel jets 35 may be cooled, increasing the flame lift-off length.

Figure 16:
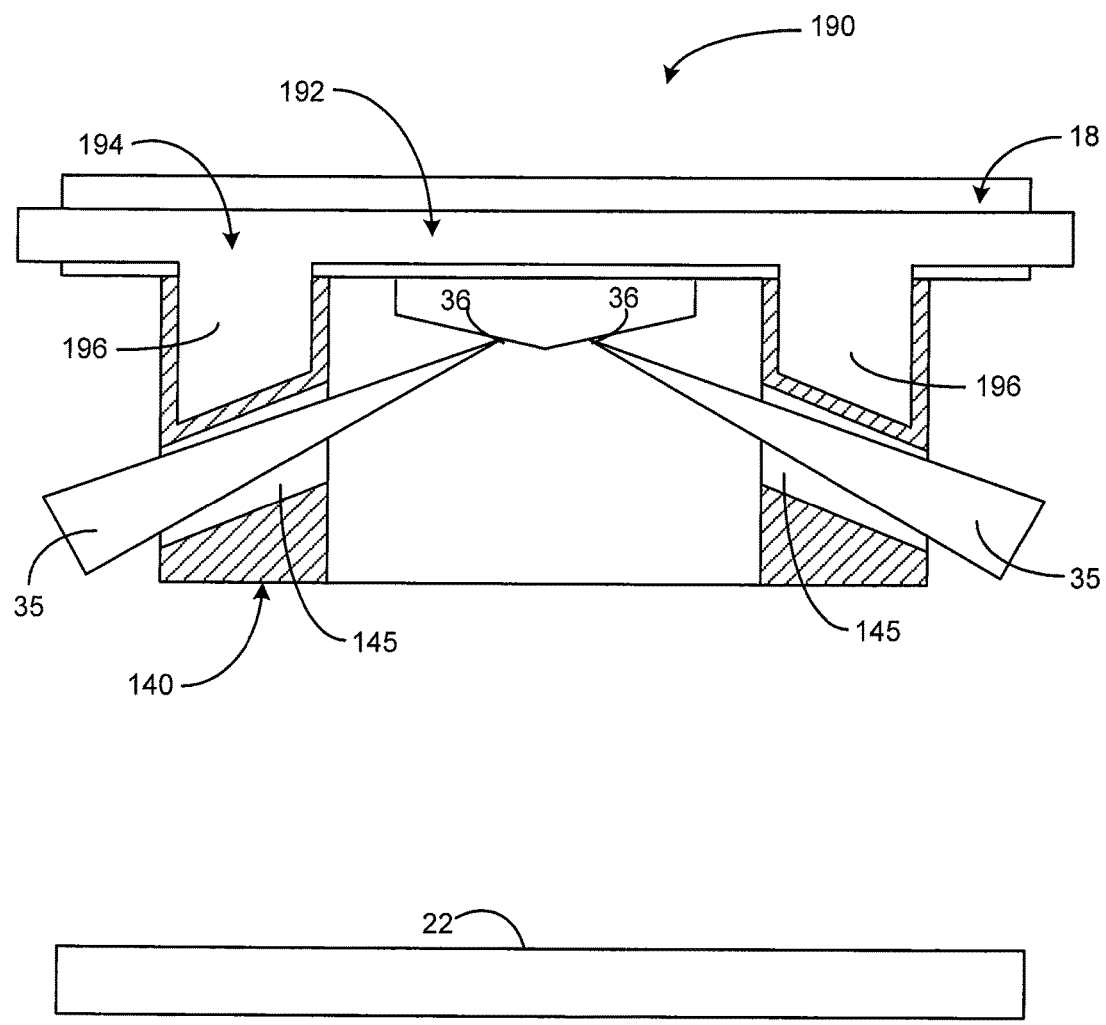
FIG. 16 is a side view of a duct structure and an associated duct cooling system, the duct cooling system utilizing a cooling reservoir, for use within the cylinder(s) of FIGS. 1 and 2, in accordance with yet another embodiment of the disclosure.

Further, another embodiment of a duct cooling system 190 for use in conjunction with the duct structure 140 is illustrated in FIG. 16. The duct cooling system 190 includes a cooling reservoir 192 which may be defined by the duct structure 140. The cooling reservoir 192 may be filled, in whole or in part, with a coolant 194, which may be water or any other liquid that may transfer heat away from the ducts 145 of the duct structure 140. The cooling reservoir 192 may be cast as part of one or both of the duct structure 140 and the cylinder head 18. Further, the cooling reservoir 192 may include a plurality of basins 196, each of the plurality of basins 196 being proximate to one of the ducts 145. Similarly to the other cooling systems detailed above, the duct cooling system 190 may direct heat away from the ducts 145, thereby cooling the fuel/air mixture within the ducts 145 and increasing the flame lift-off lengths.

INDUSTRIAL APPLICABILITY

The present disclosure relates generally to internal combustion engines and, more specifically, to ducted combustion systems. While the present disclosure shows the embodiments as related to internal combustion engines having reciprocating pistons, the teachings of the disclosure are certainly applicable to other combustion systems, which utilize diffusion or non-premixed flames, such as gas turbines, industrial burners, and the like. As discussed above, the various arrangements of ducts and their associated duct cooling systems are useful in promoting a substantially uniform fuel/air mixture within fuel jets and may inhibit or reduce entrainment of recirculated combustion products from downstream regions into upstream regions of fuel jets injected into combustion chambers. However, using such systems and methods for ducted combustion may also decrease fuel/air mixing, while reducing equivalence ratio at the lift-off length.

Figure 17:
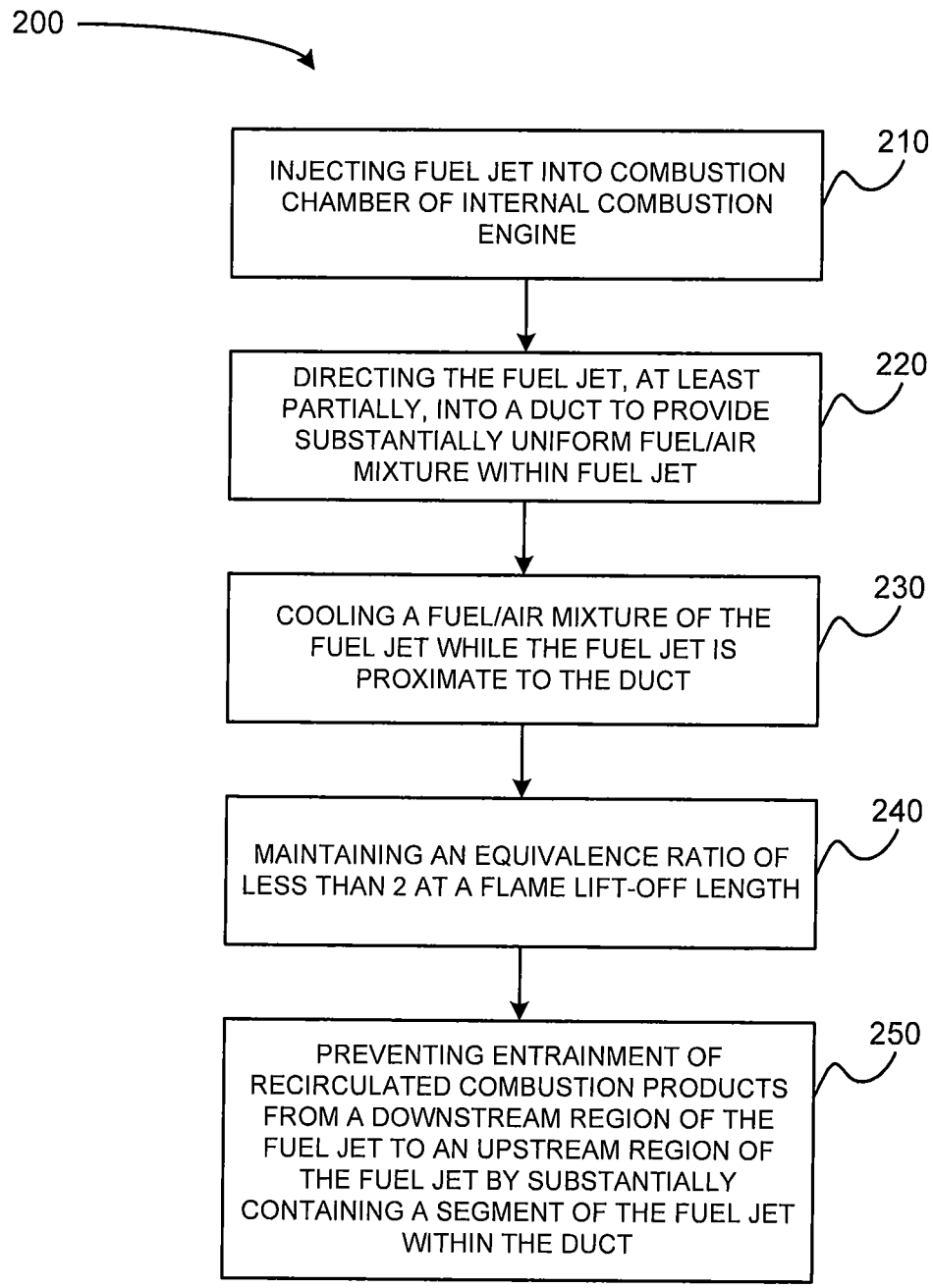
FIG. 17 is a block diagram of a flowchart representative of a method for operating a combustion system, in accordance with an embodiment of the disclosure.

An example method utilizing the ducted combustion systems shown in FIGS. 1-16 and described above is exemplified in the flowchart of FIG. 17, which represents a method 200 for operating a combustion system. The method 200 begins at block 210, by injecting a fuel jet 35 into the combustion chamber 14 of the engine 10. The fuel jet 35 may be directed, at least partially, into a duct of the one or more ducts 40, to provide a substantially uniform fuel/air mixture within the fuel jet 35, as shown in block 220. While the present description of block 220 refers to the one or more ducts 40 of FIGS. 3-11, the block 220 and/or the method 200 may employ any of the ducts shown above in FIGS. 3-16, such as, but not limited to, the ducts 145 of the duct structure 140.

The method 200 further includes cooling the fuel/air mixture of the fuel jet 35 within the one or more ducts 40, as shown in block 230. Cooling the fuel/air mixture can be achieved using a cooling system associated with the combustion chamber 14 of the engine 10, such as, but not limited to, the duct cooling systems 50, 60, 70, 80, 90, 93, 150, 160, 170, 180, 190 as described above.

Use of the duct cooling systems 50, 60, 70, 80, 90, 93, 150, 160, 170, 180, 190, or any other duct cooling system, may be useful in optimizing the flame-lift off lengths associated with the fuel jets 35. The duct cooling systems 50, 60, 70, 80, 90, 93, 150, 160, 170, 180, 190 may lower the temperatures of surfaces of the ducts 40, 145 and, thereby, cool the fuel/air mixture proximate to the ducts 40, 145. Flame lift-off lengths may increase in responses to decreases in ambient temperature; therefore, a decrease in temperature proximate to the duct(s) 40, 145 may cool the fuel jets 35 and, thereby, increase the flame lift-off length of the fuel jets 35. Increases in flame lift-off lengths may be associated with decreases in soot within the combustion chamber 14.

As such, by using the duct cooling systems 50, 60, 70, 80, 90, 93, 150, 160, 170, 180, 190, greater uniformity of equivalence ratio within the fuel jets 35 may be achieved. Achieving a reduced equivalence ratio at the lift-off length may be accomplished by altering the lift-off length, when employing any of the aspects of the present application. Alterations to the lift-off length may occur if heat is transferred from the fuel/air mixture of the fuel jets 35. Additionally or alternatively, alterations to the lift-off length may be achieved by alteration of fuel jet fluid dynamics, which are resultant of characteristics of the ducts 40. Substantially soot-free combustion may be achieved if the equivalence ratio at the flame lift-off length is less than two. Therefore, at block 240, the method 200 may include maintaining an equivalence ratio less than two at the flame lift-off length.

FIGS. 18-20 show a variety of flames produced during combustion and having different lift-off lengths and associated equivalence ratios. First, the exemplary drawing of FIG. 18 shows a fuel jet 252 with a lift-off length 254, after which the fuel jet 252 ignites into a flame 256. Such examples may have a high equivalence ratio (e.g., in a range of 4-5) at the flame lift-off length 254. Such prior art examples may include unwanted soot production within a combustion chamber.

Turning to FIG. 19, a fuel jet 262 is shown with a lift-off length 264, after which the fuel jet ignites into a flame 266. Because of the use of a duct 268 (shown in a cross-sectional view) during combustion, the lift-off length 264 is greater and the equivalence ratio (e.g., around 2-3) at the lift-off length 264 may be lower than that of FIG. 18. Having the lower equivalence ratio may lead to reduced soot production during combustion.

Lastly, FIG. 20 shows a further improvement upon the prior art example of FIG. 18, in that the length of a duct 278 (shown in a cross-sectional view) is configured to have a length configured to have a low enough equivalence ratio (less than two) such that soot formation is inhibited. A flame 276 of a fuel jet 272 may be sufficiently far enough from a fuel injector such that it has an equivalence ratio of less than two at a lift-off length 274. It has been found that an equivalence ratio of less than two may produce great results in soot reduction. The lift-off length 274 which allows for the equivalence ratio to be less than two is enabled by using the duct 278, which extends sufficiently far enough from the injector to enable such an equivalence ratio.

Returning now to FIG. 17 and, more specifically, block 250, the method 200 may reduce entrainment of recirculated combustion products from a downstream region of the fuel jet 35 to an upstream region of the fuel jet 35 by substantially containing a segment of the fuel jet 35 within a duct 40, 145. Reducing such entrainment may lead to an overall reduction in soot production within the combustion chamber 14 and may lead to greater overall efficiency of the engine 10. Presence of ducts 40, 145 may alter amount and position of entrainment of recirculated combustion products, within the fuel jets 35.

It will be appreciated that the present disclosure provides ducted combustion systems, internal combustion engines utilizing ducted combustion, and methods for operating combustion systems utilizing ducted combustion. While only certain embodiments have been set forth, alternatives and modifications will be apparent from the above description to those skilled in the art. These and other alternatives are considered equivalents and within the spirit and scope of this disclosure and the appended claims.

What is claimed is:

1. A ducted combustion system, comprising:
    a combustion chamber defined as an enclosure bound at a first end by a flame deck surface of a cylinder head of an internal combustion engine, and bound at a second end by a piston top surface of a piston disposed within the internal combustion engine;
    a fuel injector in fluid connection with the combustion chamber and including at least one orifice opening from an injector tip of the fuel injector, the at least one orifice injecting fuel into the combustion chamber as at least one fuel jet;
    at least one duct disposed within the combustion chamber between the flame deck surface and the piston top surface, the at least one duct being disposed such that the at least one fuel jet, at least partially, enters the at least one duct upon being injected into the combustion chamber, the at least one duct defining duct cooling passages;
    a duct support structure connected at one end to the at least one duct and at another end to the cylinder head, the duct support structure defining connective cooling passages in fluid communication with the duct cooling passages; and
    a duct cooling system configured to provide a coolant via the connective cooling passages to cool a mixture of fuel and air of the at least one fuel jet.

2. The ducted combustion system of claim 1, wherein the duct cooling system provides the coolant to the at least one duct via the duct cooling passages.

3. The ducted combustion system of claim 2, wherein the duct cooling system includes a heat sink associated with the coolant.

4. The ducted combustion system of claim 1, wherein the duct cooling system includes connective cooling passages for providing fuel to the duct cooling passages from a fuel source.

5. The ducted combustion system of claim 1, wherein the duct cooling system includes connective cooling passage for providing oil to the duct cooling passages from an oil source.

6. The ducted combustion system of claim 1, wherein the duct cooling system includes a trip wire at an inlet of the at least one duct.

7. The ducted combustion system of claim 1, wherein the duct cooling system includes:
    a power source; and
    a thermoelectric cooling element associated with the at least one duct and configured to use power from the power source to cool the mixture of fuel and air of the at least one fuel jet.

8. The ducted combustion system of claim 1, wherein the cooling system includes:
   one or more heat pipes, each of the one or more heat pipes associated with the at least one duct; and
   a heat sink associated with each of the one or more heat pipes.

* * * * *